Dec. 30, 1941.   S. C. LEONARD, JR   2,267,930
SEAL
Filed May 20, 1940

Inventor
SIMPSON C. LEONARD JR.
By his Attorney

Patented Dec. 30, 1941

2,267,930

UNITED STATES PATENT OFFICE 2,267,930

SEAL

Simpson C. Leonard, Jr., Detroit, Mich.

Application May 20, 1940, Serial No. 336,097

1 Claim. (Cl. 288—3)

This invention relates to a seal of the type which is adapted to be inserted in a housing or the like in encompassing relation to a part to be sealed, such as a rotatable shaft.

An object of the invention is to provide improved means for yieldably supporting a sealing member with respect to a stationary housing therefor whereby the sealing member is yieldably maintained in sealing engagement with a part to be sealed.

Another object of the invention is the provision in a seal of the foregoing type of an improved support including a plurality of spring fingers to which the sealing member is directly secured in enveloping relation therewith.

Other objects and advantages of the invention will be more apparent from the following description taken in connection with the accompanying drawing, in which.

Figure 1:
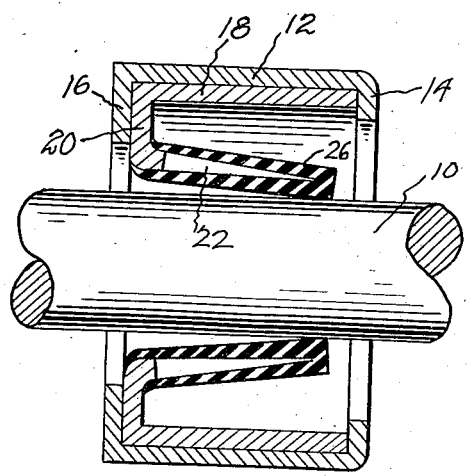
Fig. 1 is a sectional side elevational view of a seal embodying the invention and applied to a rotatable shaft.
Figure 2:
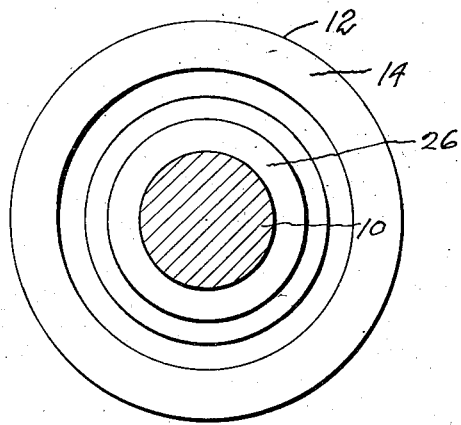
Fig. 2 is an end elevational view of the seal as shown in Fig. 1.

Referring to the drawing illustrating a preferred embodiment of the invention, the seal is shown in encompassing relation to a part to be sealed such as a rotatable shaft 10, and includes an annular housing having an axially extending flange or wall 12 and radially extending, axially spaced end flanges 14 and 16 integral with the flange 12. Positioned within the housing is a sealing member support which includes an axially extending flange 18 abutting the wall 12, a radially extending flange 20 abutting the housing flange 16; and a second axially extending flange 22 in radially spaced relation to the flange 18 and extending from the flange 20 toward the housing flange 14 and disposed slightly diagonal with respect to the axis of the housing.

Figure 3:
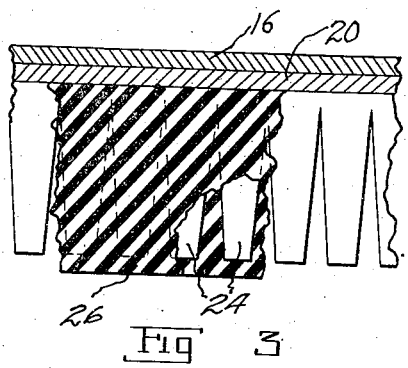
Fig. 3 is a fragmentary plan view, partly in section, illustrating the sealing member retainer shown in Fig. 1.

The flange 22 has a thickness reduced with respect to the thickness of the flange 20 so that it constitutes in effect a spring part having a taper in the direction of the free end thereof. The flange or part 22, as shown in Fig. 3, consists of a plurality of spring fingers indicated more particularly by the numeral 24 and which have a space therebetween. The fingers are preferably formed by suitably removing spaced sections of the material of the part 22.

An annular sealing member 26 of rubber-like material envelopes the spring fingers 24 and is molded thereto, this material extending into and preferably closing the space between the fingers. The fingers accommodate relative movement between the shaft and seal housing whereby the axis of one may be slightly tilted with respect to the axis of the other and at the same time maintain the sealing member 22 in sealing engagement with the shaft.

Various changes, including the size, shape and arrangement of parts, may be made without departing from the spirit of the invention and it is not my intention to limit the scope thereof other than by the terms of the appended claim.

What I claim is:

In a sealing unit adapted to encircle a part to be sealed, a housing member having an opening adapted to accommodate the part to be sealed and including axial and radial flanges, a support member including a radial flange abutting the radial flange of said housing member and a pair of radially spaced flanges integral with the radial flange of said support member, the radially outermost of said pair of flanges abutting the axial flange of said housing member, the radially innermost of said pair of flanges having a thickness reduced with respect to the thickness of the radial flange of said support member and including a plurality of spring fingers, and a rubber-like sealing member enveloping said spring fingers and bonded thereto.

SIMPSON C. LEONARD, JR.